Dec. 9, 1958  G. K. CZARNIKOW  2,863,358
PHOTOGRAPHIC LENS MOUNT
Filed Jan. 3, 1955  2 Sheets-Sheet 2
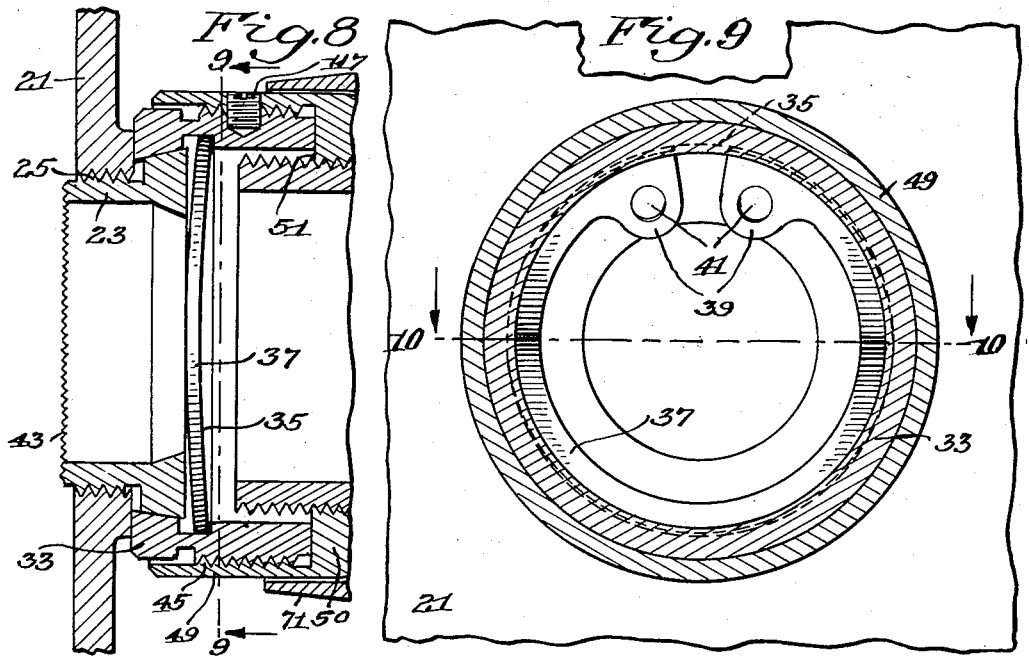
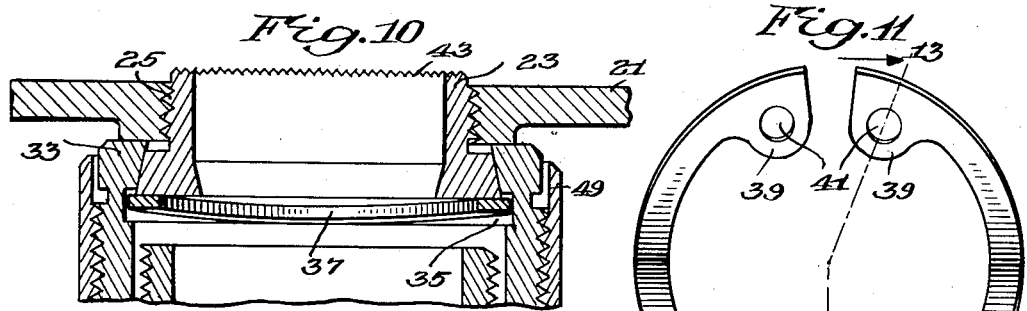
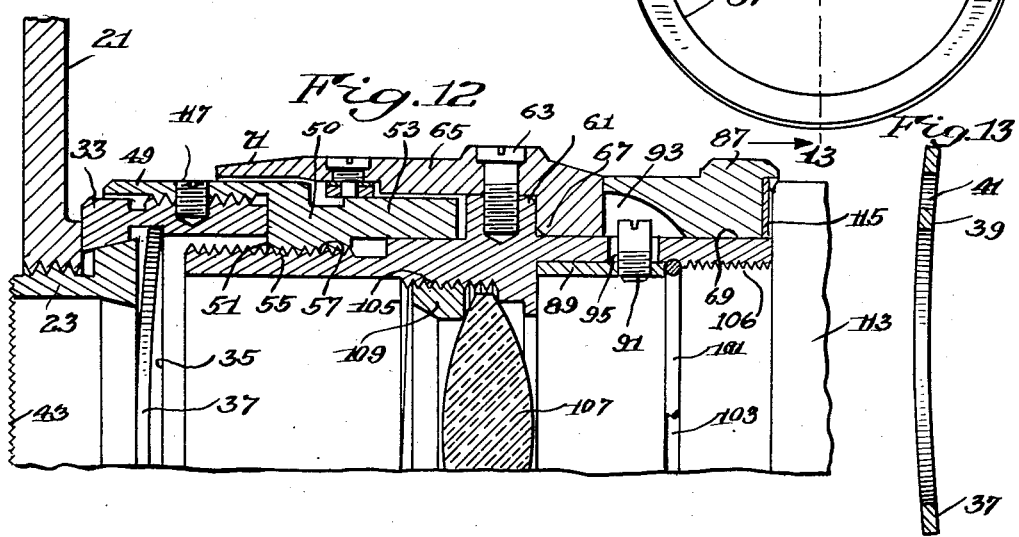

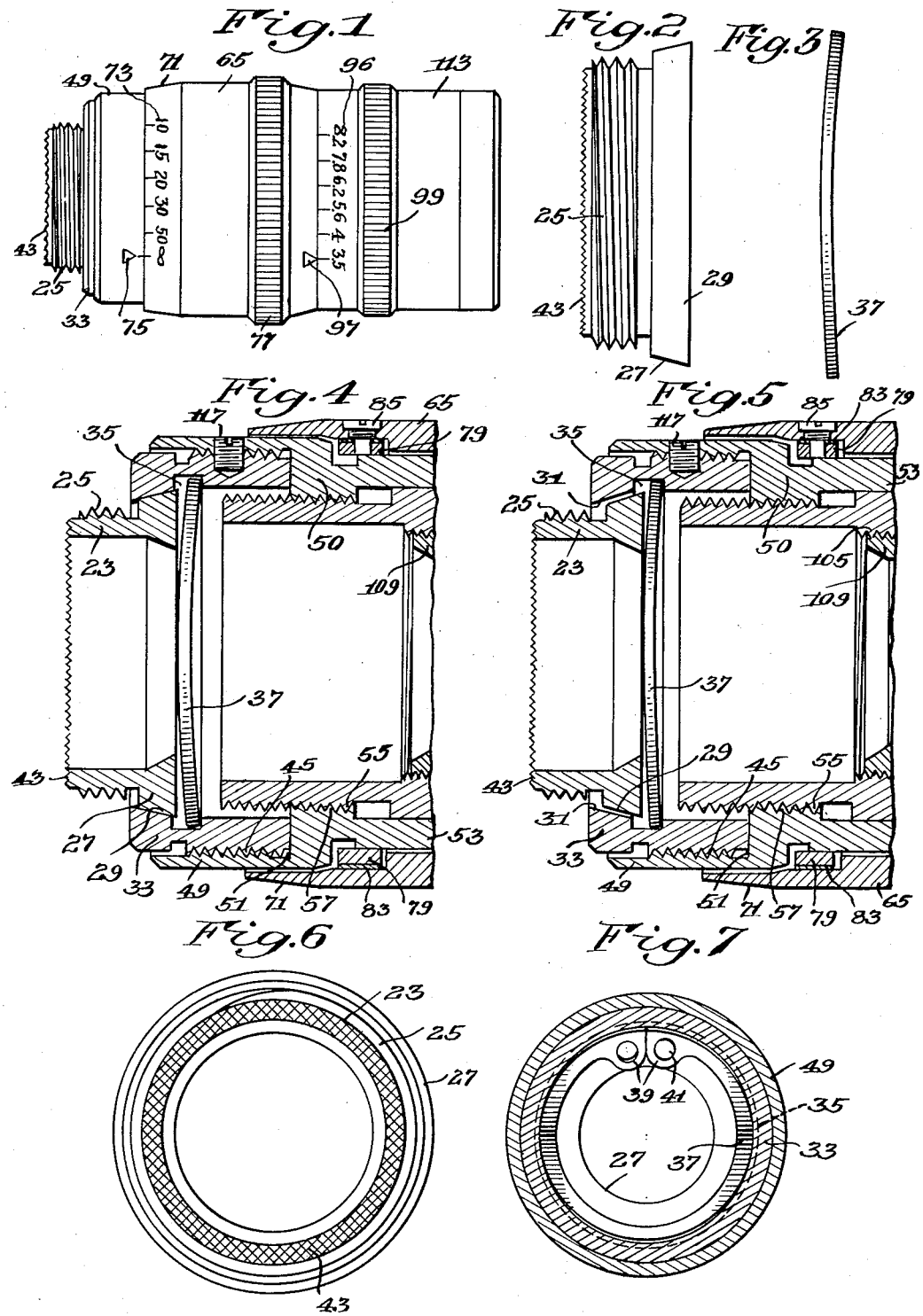

United States Patent Office 2,863,358
Patented Dec. 9, 1958

2,863,358

PHOTOGRAPHIC LENS MOUNT

George K. Czarnikow, Brighton, N. Y., assignor to Wollensak Optical Company, Rochester, N. Y., a corporation of New York Application January 3, 1955, Serial No. 479,443

5 Claims. (Cl. 88—57)

The invention relates to an adjustable lens mount for a turret type camera wherein various lens constructions are mounted on a rotatable turret plate for selective alinement with the camera optical axis. Generally these lens mounts are threadedly connected to the turret plate and various methods have been employed to insure that the lens mount, once attached to the turret plate, will have its various adjusting scales, such as a focusing and diaphragm scale, in position to be visible to and easily read by the operator.

One of these methods has been to provide the lens mount with a precise or "qualified" thread which correlates the axial and rotational movements of the lens mount so that the scales appear in the desired location when the mount is fully threaded into the turret plate. This, however, has proved uneconomical, in view of the close manufacturing tolerances, and unsatisfactory in operation since the thread wear, through use, would alter the scale positions. Another practice has been to adjust by means of various set screws, the lens mount about its optical axis relative to its threaded connection with the turret plate. Since this latter method requires special tools and a complete knowledge of the lens mount construction, in addition to being time consuming, it also is unsatisfactory. It is therefore an object of this invention to provide a generally improved and more satisfactory adjustable mount for use on a turret type camera.

Another object is the provision of a lens mount having a threaded connector which is rotatably adjustable relative to the remainder of the lens mount in order that its axial and rotational movements, during attachment to a camera turret plate, may be so correlated as to position or orient the lens mount scales in the desired location when the connector is in fully attached position.

Still another object of the invention is to provide a lens mount having a threaded connector which is releasably secured to the mount body to permit rotational adjustment of the connector relative to the body axis prior to attachment to a camera turret plate, and rotational movement of the connector and mount body as a unit during attachment to a camera turret plate.

A further object is to provide a lens mount having a threaded connector which is adjustable relative to the remainder of the lens mount and which is locked in adjusted position as the mount is attached to a camera turret plate.

A still further object of the invention is to provide a lens mount adapted for removable attachment to a camera turret plate and having means facilitating lens focusing and diaphragm adjustment without affecting the connection between the mount and the camera turret plate.

A still further object is the provision of a lens mount having an adjustable connector which may be moved into adjusted position, without the use of any special skills or tools, and which may be frictionally maintained in set position to permit the lens mount to move as a unit during attachment to a camera turret plate.

A still further object is the provision of a lens mount which is simple in construction and operation, and which is constructed of a plurality of separable elements enabling easy and rapid replacement of worn or damaged parts without affecting the operation or structure of the remaining parts.

These and other desirable objects may be attained in the manner disclosed as an illustrative embodiment of the invention in the following description and in the accompanying drawings forming a part hereof, in which:

Fig. 1 is a top plan of the lens mount shown removed from the camera turret plate;

Fig. 2 is a side elevation of the lens mount adjustable connector shown removed from the lens mount;

Fig. 3 is a detail view showing a side elevation of a retaining washer;

Fig. 4 is an approximately central vertical section taken longitudinally through the rear portion of the lens mount, showing the relative position of the elements when the adjustable lens mount connector is set in adjusted position;

Fig. 5 is a view similar to Fig. 4 showing the relative position of the elements during the adjustment of the lens mount connector;

Fig. 6 is a left or rear end elevation of the structure shown in Fig. 2;

Fig. 7 is a transverse vertical section taken through the rear portion of the lens mount (similar to Fig. 9) showing the manner of inserting the retaining washer;

Fig. 8 is a view similar to Figs. 4 and 5 but showing the lens mount attached to a camera turret plate shown in part;

Fig. 9 is a transverse vertical section taken approximately on the line 9—9 of Fig. 8;

Fig. 10 is a partial central horizontal section taken approximately on the line 10—10 of Fig. 9;

Fig. 11 is a front elevation of the retaining washer shown in Fig. 3;

Fig. 12 is a partial vertical section taken longitudinally through the mount shown in Fig. 1; and Fig. 13 is a section taken approximately on the line 13—13 of Fig. 11.

The same reference numerals throughout the several views indicate the same parts.

With reference to the drawings, the preferred embodiment of the invention is adapted to be supported on a conventional turret plate 21, rotatably mounted on the front of a camera to permit selective alinement of one of the various lens constructions, carried by the plate, with the camera optical axis. The mount is secured to the turret plate 21, shown in part, by means of a rearwardly projecting connector or adapter 23 of tubular configuration and including an externally threaded rear end portion 25, adapted to be received within a suitable aperture in the turret plate, and an outwardly projecting peripheral shoulder or lip 27 from which the remainder of the mount is supported. The shoulder 27 has a rearwardly inclined or tapered face 29, giving the shoulder the appearance of a circular wedge block which is received within a cooperating tapered opening 31 of the tubular focusing alinement ring 33. The internal surface of the alinement ring 33 is provided with a circular notch or groove 35, located forwardly of the opening 31, which is adapted to receive and retain therein the retaining washer 37.

The washer 37 is of split ring construction (see Fig. 11) having an arched or flexed cross-section (see Fig. 13) and is formed of spring metal which tends to return the washer to its original position, shown in Figs. 11 and 13, even after repeated bending. The free ends of the retaining washers are each enlarged, in a radial direction, at 39 and are each provided with an opening 41, in which are received pins or ears of suitable pliers or pincers for drawing the free ends of the washer toward each other during assembly or disassembly of the mount. In the expanded position (Figs. 9 and 11) the washer has a diameter slightly greater than that of the bottom of the groove 35. However, by the use of pliers or pincers, as above described, the washer diameter may be reduced sufficiently (as in Fig. 7) to permit its insertion through the forward end of the alinement ring 33 and into the groove 35, it being understood that the mount structure forward of the alinement ring is removed at this stage of assembly.

Once the washer is located within the groove 35, and the tool is removed, the combined effect of the resilient force tending to expand the washer and the flexed or arched cross-section of the washer, causes the washer to assume a position as shown in Figs. 4 and 9. In this position, the washer 37 exerts a rearward force against the front face of the threaded connector, which tends to drive the connector further into the alinement ring opening 31, thereby increasing the degree of friction between the face 29 of the connector shoulder 27 and the tapered wall of the opening 31. This frictional engagement between the connector and the alinement ring 33 permits both of these elements to rotate in unison by applying a turning force to either of these parts. In addition, the connector and alinement ring 33 may be rotated relative to each other by first applying an axial force to the rear end of the connector, against the spring action of the washer 37, and then rotating either ring 33 or the connector while the other of these members is held stationary. To facilitate this latter rotation, the rear face of the connector is knurled at 43, as seen in Fig. 6.

Supported from this ring 33 (which is rotatably adjustable relative to the threaded part 25, as above mentioned) is the rest of the lens mount, including the parts which carry the lens elements or components, the iris diaphragm, the focusing ring, and the diaphragm adjusting ring. These other parts may be of any suitable or conventional construction, and may be varied at will without affecting the present invention. The following partial description of the remaining parts of the lens mount is intended, therefore, merely as a general disclosure of one of many possible ways in which these parts of the mount may be built.

The focusing alinement ring 33 is provided with an external thread 45 on which is threaded the enlarged rear portion 49 of the focusing index ring or sleeve 50. Approximately midway of the index ring 50 is formed an inwardly directed radial shoulder 51 from which extends forwardly, a front portion 53 of reduced external and internal diameter. The rear end of the index ring front portion 53 is provided with an internal thread 55 which engages with the externally threaded end 57 of a tubular central support member or main lens tube, in which are mounted the lens and diaphragm system. Extending radially outward from approximately the midportion of the support member is a peripheral projection or lip 61 to which is secured, as by screw 63, the focusing scale ring or sleeve 65.

The forward end of the scale sleeve 65 is directed radially inward at 67 into engagement with the front wall of the projection 61 and the front bearing surface 69 of the lens tube, while the remainder of the scale sleeve 65 overlaps a large portion of the index ring 50 and terminates with a rearwardly tapering or inclined edge 71. A suitable distance scale 73 and cooperating index mark or pointer 75 are inscribed respectively on the edge 71 of the scale sleeve 65 and the rear portion 49 of the index ring, it being understood that the location of the scale 73 and index mark 75 may be reversed if desired. A portion of the external periphery of the scale ring 61 may be serrated or grooved at 77 to provide greater friction between the ring 61 and the operator's fingers during focusing adjustment.

While the friction developed between the contacting surfaces of the index ring and the lens tube may at times be sufficient to maintain the focusing elements in adjusted position, the lens mount is provided with additional friction means to prevent any undesired movement of these parts. This additional friction means includes an arcuate friction ring or brake shoe 79 within a recess formed in the internal surface of the focusing scale sleeve 65, and engaging the smooth periphery of the portion 53 of the index ring 51. A resilient compression member 83 is interposed between the brake shoe 79 and the scale sleeve 65. A screw 85, threaded through the scale sleeve 65 with its smooth inner end received in an opening in the shoe 79, serves to transmit the rotary motion of the sleeve to the shoe, thus increasing the frictional resistance to turning the focusing sleeve relative to the ring 50.

The front bearing surface 69 of the lens tube rotatably supports the diaphragm adjusting ring 87, the rear end of which abuts against the front end of the focusing sleeve 65. Rotation of the ring 87 varies the diaphragm or stop opening formed by the iris diaphragm leaves, which have been omitted for the sake of simplicity and clarity, but which are operatively connected to the inner adjusting ring 89. This rotational movement of the external ring 87 is transmitted to the inner ring 89 by means of the screw 91 which has its lower end threaded into the ring 89, while its head is disposed in the notch or recess 93 formed in the internal and rear surfaces of the ring 87. The screw 91 travels along the arcuate slot 95, formed in the bearing surface 69 of the lens tube, as the diaphragm adjusting ring 87 is turned to rotate the adjusting ring 89 and actuating the diaphragm leaves for the desired adjustment. A suitable diaphragm stop or f scale 96 and index mark or pointer 97 are provided on the external periphery of the diaphragm ring 87 and the focusing scale ring as shown in Fig. 1, it being understood that the locations of the scale 96 and pointer 97 may be reversed if desired. Longitudinally extending serrations or grooves 99 may be provided on the external surface of the diaphragm adjusting ring 87 to form a gripping surface for the operator's fingers.

The inner adjusting ring 89 is held in axial position by means of the resilient split ring 101 which bears against the front edge of the ring 89 and is retained in the groove 103 formed on the internal periphery of the central support member.

The lens tube is provided with internal threads at 105 and 106 for mounting suitable lens components or elements. For example, a lens element 107 may be held by a retaining ring 109 screwed into the threads 105. A front lens mount fragmentarily indicated at 113 may have a portion screwed into the threads 106, and an external rearwardly faced shoulder on the mount 113 lies ahead of the diaphragm adjusting ring 87 to prevent forward axial movement thereof, a resilient compression member 115 being interposed between these parts to act as a frictional brake against accidental turning of the diaphragm adjusting parts.

When the mount is being assembled (the steps of which are believed obvious from the above description and drawings), the ring 50 is screwed home on the ring 33, and is locked in set position by the set screw 117, so that thereafter the two rings 33 and 50 act in effect as one integral ring.

The mount is now ready for use and is applied to the camera turret plate 21 (or directly to the threaded aperture in the front wall of the camera, if used on a camera without a turret) by threading the connector end 25 into the turret plate opening. As the rear end of the alinement ring 33 engages the face of the turret plate 21 (or the front wall of the camera, if used on a camera without a turret) the tapered shoulder 27 of the connector 33 is drawn further into the opening 31 of the ring 33 and thus creates sufficient friction between the face 29 of the connector shoulder 27 and the wall of the opening 31 to prevent relative movement between these parts. Once the mount is fixed to the turret plate, the operator can observe the position of the scale 73 and index 75, and if they are not located in the desired position of orientation, he can readily estimate the degree and direction of required adjustment of the connector relative to the alinement ring. The mount is then removed from the turret plate 21, and a forward pressure is applied to the knurled end 43 of the connector, against the resilient action of the washer 37, to position the parts as shown in Fig. 5. With the forward pressure being maintained, a rotary force is applied to the connector in the desired direction and to the correct extent. Upon removal of this forward pressure, the resilient force of the washer 37 urges the connector rearwardly to the position shown in Fig. 4. The mount is again applied to the turret plate 21 and, if correctly adjusted in accordance with the steps set forth above, the scales 73 and 96 and their indexes 75 and 97 will be disposed in the desired positions, usually at the top of the lens mount so as to be read easily by an operator looking downwardly from above.

The focusing adjustment may now be made in the usual way by turning the focusing scale sleeve which, being fixed to the lens tube by screw 63, rotates the lens tube with it, causing it to move the lens 107, etc., toward or away from the camera. The diaphragm adjustment is accomplished by rotating the external ring 87 which in turn rotates the internal ring 89 through the connecting screw 91. The extent of both of these adjustments can be readily observed by means of the cooperating scales 73 and 96 and the index marks 75 and 97, respectively.

The threaded connector, therefore, correlates the axial and rotational movements of the lens mount during attachment to the turret plate to insure that the focusing and diaphragm scales will be located in the desired visible positions. Furthermore, this result is accomplished without altering in any way the normal function or manner of operation of the lens mount and without the use of any special skill or tools.

The ring 33 and the various parts supported thereby and extending forwardly therefrom may be collectively called a scale-carrying assembly or an index-carrying assembly, since such parts carry one or both of the scales 73 and 96, and one or both of the index marks 75 and 97, the correct and easy orientation of which is accomplished by the present invention.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A lens mount adapted to be screwed onto a threaded part of a photographic camera and capable of easy orientation with respect to the camera so that a scale carried by the lens mount may be brought to a visually accessible position, said mount comprising a ring shaped first member having a screw thread adapted to be screwed onto a threaded part of a photographic camera, a tubular second member supported from said first member and serving in turn to support a lens and a scale index mark, said second member being rotatable relative to the first member substantially about the optical axis of the lens as a center of rotation, so that by turning one of said members relative to the other the scale index mark may be oriented to the side of the second member which is most conveniently visible when said first member is screwed home relative to the camera, separable complementary interlocking inclined tapered surface parts on the first and second members, respectively, for preventing relative rotation of said two members, said interlocking parts being released for rotation by axial movement of one of said members relative to the other in one direction, and a spring tending to move said two members relative to each other axially in the opposite direction, to tend to hold said complementary parts in effective interlocked non-rotary condition by increasing the degree of friction between said inclined tapered parts, said two parts being capable of rotary orientation relative to each other when moved axially relative to each other against the force of said spring.

2. A construction as defined in claim 1, in which said spring is in the form of a flat metal ring-like member warped out of a true plane and interposed between said first member and said second member.

3. A construction as defined in claim 1, in which said second member has a shoulder for engaging the camera part onto which said first member is screwed, the reaction of said shoulder against said camera part tending to interlock said separable complementary parts firmly with each other when said first member is screwed home onto a camera.

4. A lens mount adapted to be secured to a part of a photographic camera and capable of easy orientation with respect to the camera so that a scale carried by the lens mount may be brought to a visually accessible position, said mount comprising a ring shaped first member having means adapted to be connected to a part of a camera, a tubular second member supported from said first member and serving in turn to support a lens and a scale index mark, said second member being rotatable relative to the first member substantially about the optical axis of the lens as a center of rotation, so that by turning one of said members relative to the other the scale index mark may be oriented to the side of the second member which is most conveniently visible when said first member is connected relative to the camera, separable complementary interlocking inclined tapered surface parts on the first and second members, respectively, for preventing relative rotation of said two members, said interlocking parts being released for rotation by axial movement of one of said members relative to the other in one direction, and resilient means tending to move said two members relative to each other axially in the opposite direction, to tend to hold said complementary parts in effective interlocked non-rotary condition by increasing the degree of friction between said inclined tapered parts, said two parts being capable of rotary orientation relative to each other when moved axially relative to each other against the force of said resilient means.

5. A lens mount structure capable of adjustable orientation with respect to a fixed internal screw thread in a lens mounting aperture of a mounting plate of a photographic camera, said mount structure including a ring shaped tubular member having an external screw thread to be screwed into said internal screw thread in said mounting aperture and also having a portion projecting forwardly from said external screw thread, said forwardly projecting portion having a rearwardly faced gripping shoulder of generally frusto-conical shape spaced forwardly from a mounting plate into which said tubular member is screwed, a scale-carrying assembly supported from and extending forwardly from said tubular member, said assembly having near its rear end a forwardly faced gripping shoulder of generally frusto-conical shape normally mating with and in tight gripping engagement with said rearwardly faced gripping shoulder of said tubular member, said assembly also having substantially at its rear end an abutment surface to engage said mounting plate thereby to press said assembly forwardly to hold the forwardly faced gripping shoulder thereof in tight rotation-preventing engagement with the rearwardly faced gripping shoulder of said tubular member when said tubular member is screwed into said mounting structure, and a spring tending to maintain said two gripping shoulders in engagement with each other independently of the reaction force of said mounting plate against said abutment surface.

References Cited in the file of this patent

UNITED STATES PATENTS

| | | |
|---|---|---|
| 2,026,724 | Wollensak | Jan. 7, 1936 |
| 2,180,027 | Wittel | Nov. 14, 1936 |
| 2,287,468 | Cisski | June 23, 1942 |
| 2,293,592 | Cisski | Aug. 18, 1942 |
| 2,307,345 | Zuber | Jan. 5, 1943 |
| 2,500,050 | Wittel | Mar. 7, 1950 |